US011958709B2

(12) United States Patent
Chihara et al.

(10) Patent No.: US 11,958,709 B2
(45) Date of Patent: Apr. 16, 2024

(54) RECORDING MATERIAL PROCESSING APPARATUS OR IMAGE FORMING SYSTEM EACH OF WHICH EXECUTES STAPLING PROCESS

(71) Applicant: CANON KABUSHIKI KAISHA, Tokyo (JP)

(72) Inventors: Hiroshi Chihara, Suntou-gun (JP); Kazuhisa Sato, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/331,872

(22) Filed: Jun. 8, 2023

(65) Prior Publication Data

US 2023/0331508 A1 Oct. 19, 2023

Related U.S. Application Data

(63) Continuation of application No. 17/823,425, filed on Aug. 30, 2022, now Pat. No. 11,713,207, which is a (Continued)

(30) Foreign Application Priority Data

Nov. 29, 2018 (JP) ................................ 2018-224155

(51) Int. Cl.
*B65H 37/04* (2006.01)
*B65H 43/02* (2006.01)

(52) U.S. Cl.
CPC ............. *B65H 37/04* (2013.01); *B65H 43/02* (2013.01); *B65H 2301/51611* (2013.01); (Continued)

(58) Field of Classification Search
CPC .................... B65H 37/04; B65H 43/02; B65H 2301/51616; B65H 2407/21; B65H 2801/27; G03G 2215/00721
(Continued)

(56) References Cited

U.S. PATENT DOCUMENTS 4,878,656 A * 11/1989 Honjo ................ G03G 15/6541 270/37
4,917,366 A * 4/1990 Murakami ......... G03G 15/6541 227/7
(Continued)

*Primary Examiner* — Leslie A Nicholson, III
(74) *Attorney, Agent, or Firm* — Canon U.S.A., Inc. I.P. Division

(57) ABSTRACT

A recording material processing apparatus includes a processing tray, a detecting unit, a stapling unit, an instructing unit, a control unit, a switching unit, and a notifying unit. The detecting unit detects recording material placed in the processing tray. The stapling unit executes a stapling process for the recording material placed in the processing tray. The instructing unit outputs a stapling process execution instruction. Upon receipt of the execution instruction in a state in which the detecting unit has detected a recording material inserted in the processing tray from an outside of a main body of a main body apparatus, the control unit cause the stapling process to be executed. The switching unit switches a position of the stapling unit among a plurality of positions. The notifying unit provides notification of a placement position of the recording material in the processing tray corresponding to each of the plurality of positions.

1 Claim, 10 Drawing Sheets

Related U.S. Application Data continuation of application No. 17/348,628, filed on Jun. 15, 2021, now Pat. No. 11,472,659, which is a continuation of application No. 16/688,940, filed on Nov. 19, 2019, now Pat. No. 11,066,267.

(52) U.S. Cl.
CPC ...... *B65H 2407/21* (2013.01); *B65H 2801/27* (2013.01); *G03G 2215/00721* (2013.01)

(58) Field of Classification Search
USPC ................................ 270/58.07, 58.08, 58.09
See application file for complete search history.

(56) References Cited

U.S. PATENT DOCUMENTS

| | | | | |
|---|---|---|---|---|
| 8,146,908 | B2 * | 4/2012 | Terao | B42C 1/12<br>270/58.08 |
| 8,226,079 | B2 * | 7/2012 | Ozawa | B65H 31/34<br>270/58.08 |
| 9,139,397 | B2 * | 9/2015 | Sato | B42C 1/12 |
| 9,586,429 | B2 * | 3/2017 | Nakagomi | B42C 1/12 |
| 9,586,783 | B2 * | 3/2017 | Obuchi | G03G 15/6544 |
| 10,071,876 | B2 * | 9/2018 | Komiyama | B65H 29/125 |

* cited by examiner

RECORDING MATERIAL PROCESSING APPARATUS OR IMAGE FORMING SYSTEM EACH OF WHICH EXECUTES STAPLING PROCESS

CROSS REFERENCE TO RELATED APPLICATIONS

This application is a continuation of U.S. patent application Ser. No. 17/823,425, filed on Aug. 30, 2022, which is a continuation of U.S. patent application Ser. No. 17/348,628, filed on Jun. 15, 2021 and issued as U.S. Pat. No. 11,472,659 on Oct. 18, 2022, which is a continuation of U.S. patent application Ser. No. 16/688,940, filed on Nov. 19, 2019 and issued as U.S. Pat. No. 11,066,267 on Jul. 20, 2021, which claims priority from Japanese Patent Application No. 2018-224155, filed Nov. 29, 2018, all of which are hereby incorporated by reference herein in their entirety.

BACKGROUND

Field

The present disclosure relates to a recording material processing apparatus that executes a stapling process for a recording material or an image forming system that includes an image forming apparatus that execute image formation for a recording material and a post processing apparatus that executes a stapling process for a recording material conveyed from the image forming apparatus.

Description of the Related Art

Among post processing apparatuses that receive a recording material discharged from an image forming apparatus, such as a copying machine and a printer and execute post-processing, there is one that executes a stapling process for the received recording material (hereinafter, this function is referred to as automatic stapling). Moreover, among the other post processing apparatuses, there is one that executes a stapling process for a recording material inserted from the outside of a main body of an apparatus by a user (hereinafter, this function is referred to as manual stapling).

Japanese Patent Laid-Open No. 2005-206298 discloses a post processing apparatus that realizes two functions by one stapling unit without providing a stapling unit that performs the automatic stapling and a stapling unit that performs the manual stapling, separately. In this post processing apparatus, when a user inserts a recording material into a processing tray to perform the automatic stapling from a discharging port of the post processing apparatus and pushes an execution button for the manual stapling, a stapling process is executed for the inserted recording material.

Japanese Patent Laid-Open No. 2003-81521 discloses a post processing apparatus that, in the case of performing the automatic stapling, aligns the position of sheets placed in a processing tray with a guide member. In this post processing apparatus, in the case of performing the manual stapling, a guide member is moved to a position corresponding to the maximum sheet size so that the guide member does not interfere with sheets to be inserted from the outside of a main body of the apparatus.

However, a position where a stapling process is executed by the manual stapling is not necessarily fixed. For example, a configuration is also considered in which a user can switch a position of a stapler such that a stapling process may be executed not only at a corner of a sheet, but also at a central end of a sheet. Furthermore, at the time of executing the manual stapling, a case where a user inserts a sheet with a size smaller than the maximum size in a processing tray, may be also considered.

According to the configuration disclosed by Japanese Patent Laid-Open No. 2003-81521, in the case of executing the manual stapling, since a guide member is moved to a position corresponding to the maximum size, at the time of inserting a sheet with a size smaller than the maximum size, a degree of freedom is created for a setting position of a sheet. At this time, in the case where a sheet is not set at a position corresponding to the position of a stapler, a stapling process will be executed at a position that a user does not intend, or it will cause air shot, and then, the staple of a stapler will be consumed wastefully. In this connection, the above-described issues are applied also to a post processing apparatus that executes only the manual stapling with one stapling unit.

SUMMARY

According to an aspect of the present disclosure, a recording material processing apparatus includes a processing tray in which a recording material is to be placed, a detecting unit configured to detect the recording material placed in the processing tray, a stapling unit configured to execute a stapling process for the recording material placed in the processing tray, an instructing unit configured to output an execution instruction of the stapling process by the stapling unit, a control unit configured to, upon receipt of the execution instruction from the instructing unit in a state in which the detecting unit has detected a recording material inserted in the processing tray from an outside of a main body of a main body apparatus, cause the stapling process to be executed, a switching unit configured to switch a position of the stapling unit among a plurality of positions, and a notifying unit configured to provide notification of a placement position of the recording material in the processing tray corresponding to each of the plurality of positions.

Further features of the present disclosure will become apparent from the following description of exemplary embodiments (with reference to the attached drawings).

DESCRIPTION OF THE EMBODIMENTS

Example 1

In the present example, description is given to a configuration in which as a unit that notifies a user of a position where a bundle of sheet for manual stapling is to be set, a seal pasted on a main body of an apparatus or an engraved mark formed on a main body of an apparatus, has been adopted.

Figure 1:
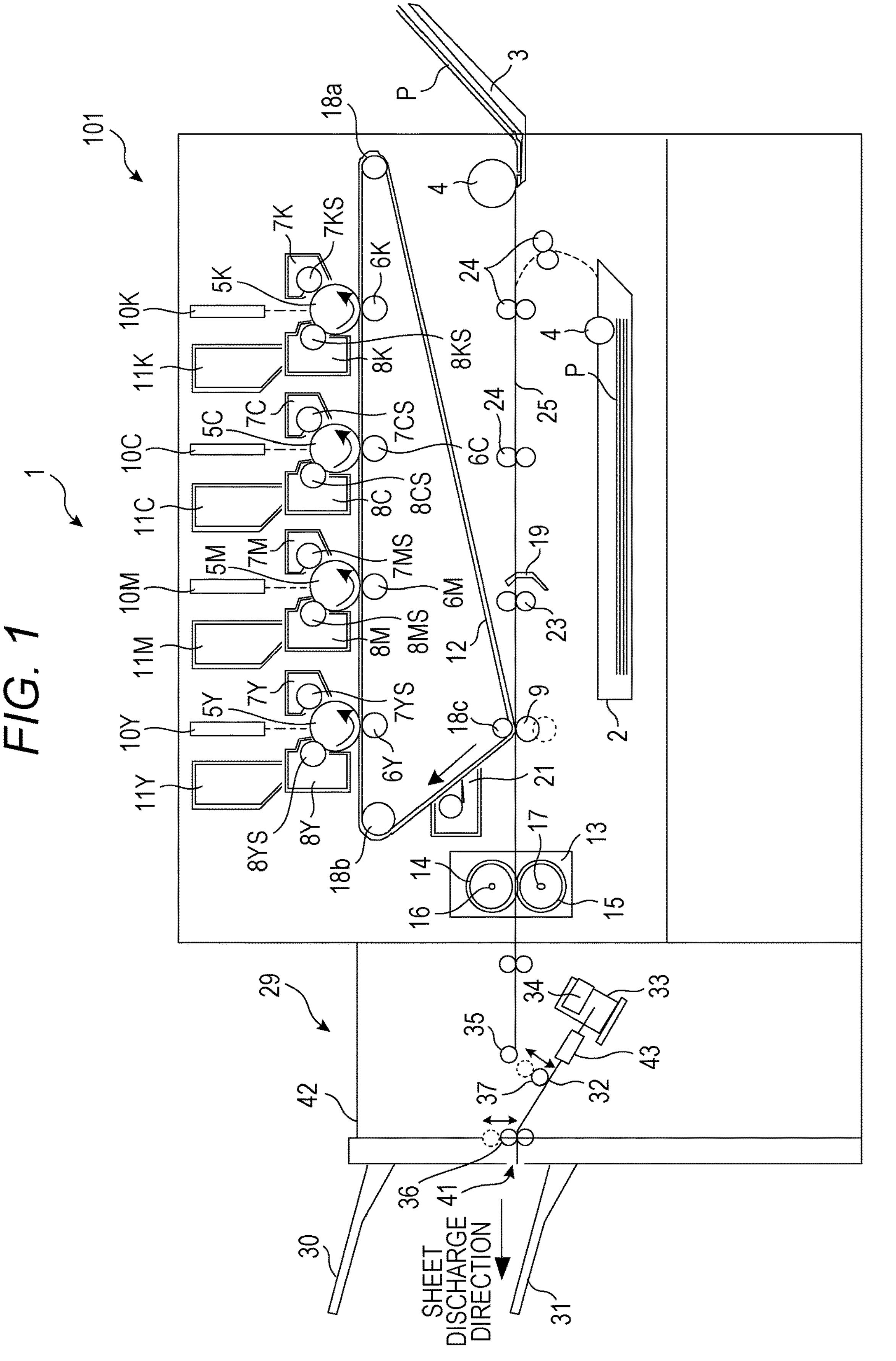
FIG. 1 is a drawing showing a configuration of an image forming apparatus and a post processing apparatus.

FIG. 1 is a drawing showing a configuration of an image forming system 1 including an image forming apparatus 101 and a post processing apparatus 29 (recording material processing apparatus) in the present embodiment. The image forming apparatus 101 is a color laser beam printer of an electrophotographic system. The image forming apparatus 101 includes photoconductive drums 5Y, 5M, 5C, and 5K that are provided for the respective stations juxtaposed corresponding to the number of development colors and each of which is configured such that the outer periphery of an aluminum cylinder is coated with an organic photoconductive layer. Here, Y represents yellow, M represents magenta, C represents cyan, and K represents black, and hereinafter, these relationships are omitted except for the case of being required. The image forming apparatus 101 includes a charge device 7, a laser scanner 10, a developing device 8, a toner cartridge 11, an intermediate transfer belt 12, a primary transfer roller 6, a secondary transfer roller 9, and a fixing device 13.

Upon start of a printing operation, the photoconductive drum 5 is rotated in the counterclockwise rotation direction (in the direction of an arrow in the drawing) by a not-illustrated drive motor. The charge device 7 includes a charging sleeve 7S (7YS, 7MS, 7CS, 7KS) in order to charge the photoconductive drum 5. The surface of the photoconductive drum 5 charged by the charging sleeve 7S is exposed by the laser scanner 10. The laser scanner 10 exposes the photoconductive drum 5 based on input image data and forms an electrostatic latent image on the photoconductive drum 5. The developing device 8 includes a developing sleeve 8S (8YS, 8MS, 8CS, 8CK) in order to visualize the electrostatic latent image formed on the photoconductive drum 5. The developing sleeve 8S visualizes an electrostatic latent image as a toner image by supplying toner to the photoconductive drum 5.

The intermediate transfer belt 12 is an endless belt stretched by a driving roller 18*a* and driven rollers 18*b* and 18*c*. The intermediate transfer belt 12 rotates in the clockwise rotation direction (the direction of an arrow, in the drawing) by the driving roller 18*a* while being in contact with the photoconductive drum 5. Then, onto the intermediate transfer belt 12, toner images are transferred sequentially by a primary transfer roller 6 (hereinafter, referred to as "primary transfer"). A toner image of each of colors is transferred so as to be superimposed on the intermediate transfer belt 12, whereby a color image is formed on the intermediate transfer belt 12.

In a sheet feeding cassette 2 or a multi-tray 3, a sheet P (recording material) is placed. A sheet feeding roller 4 feeds a sheet P to a conveyance path 25 from the sheet feeding cassette 2 or the multi-tray 3. The sheet P fed to the conveyance path 25 is conveyed towards a registration sensor 19 by a conveying roller 24. Upon detection of a leading edge of the sheet P by the registration sensor 19, the sheet P is conveyed further by a certain amount and is made to butt against a registration roller 23 being stopped. With this, flexion (also referred to as a loop) is formed on the sheet P. The registration roller 23 re-conveys the sheet P being stopped to the secondary transfer roller 9 so as to match a timing with a toner image formed on the intermediate transfer belt 12. The sheet P is nipped and conveyed by the intermediate transfer belt 12 and the secondary transfer roller 9, and toner images formed on the intermediate transfer belt 12 are transferred collectively onto the sheet P (hereinafter, referred to as secondary transfer). In the case of performing the secondary transfer, the secondary transfer roller 9 moves to a position indicated with a solid line and comes in contact with the intermediate transfer belt 12. However, in the case of not performing the secondary transfer, the secondary transfer roller 9 moves to a position indicated with a broken line and is separated from the intermediate transfer belt 12.

The fixing device 13 fixes the transferred toner image onto the sheet P while conveying the sheet P. The fixing device 13 includes a fixing roller 14 that heats the sheet P and a pressing roller 15 that makes the sheet P come in pressure contact with the fixing roller 14. The fixing roller 14 and the pressing roller 15 are formed in the shape of hollow and include heaters 16 and 17 in the inside, respectively. A cleaning device 21 cleans toner which has remained on the intermediate transfer belt 12. The cleaned toner is stored in a cleaner container included in the cleaning device 21.

The post processing apparatus 29 receives the sheets P discharged from the image forming apparatus 101 and performs post-processing for the received sheets P. For example, the post processing apparatus 29 has a function that classifies the received sheet P into a plurality of sheet discharge trays 30 and 31 (discharge tray), a function to collect a plurality of sheets P by performing a stapling process (binding process), and the like. In the case of classifying the sheet P into the sheet discharge trays 30 and 31, the sheet discharge trays 30 and 31 are moved upward and downward by a motor (not shown) for raising and lowering the sheet discharge trays 30 and 31.

A configuration with regard to the stapling process will be described in detail. A stapling unit 33 executes the stapling process for a plurality of sheets P stacked in a stapling tray 32 (processing tray). Furthermore, the stapling unit 33 includes a staple cartridge 34. In the staple cartridge 34, needles used for the stapling process are collected.

Next, with reference to FIG. 1 and FIGS. 2A to 2E that are bird's-eye views of the post processing apparatus 29 in the present example, description is given to a case of executing a stapling process for a sheets P discharged from the image forming apparatus 101. Hereinafter, this function is referred to as automatic stapling.

Figure 2A:
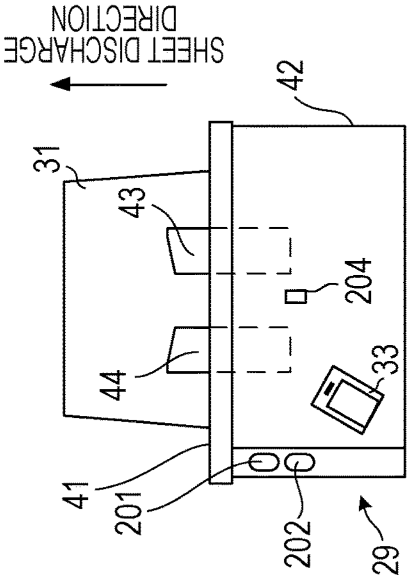
FIGS. 2A to 2E are bird's-eye views of the post processing apparatus.

At a time point when a trailing edge of a sheet P conveyed from the image forming apparatus 101 to the post processing apparatus 29 passes a conveyance roller pair 35 and reaches a discharge roller pair 36, the discharge roller pair 36 and a drawing-in roller 37 are made to rotate in a reverse rotation direction so as to draw in and stack the sheet P into the stapling tray 32. After the previously designated number of sheets P have been stacked in the stapling tray 32, the discharge roller pair 36 and the drawing-in roller 37 are made to move to a position indicated with a broken line. Then, sheet guides 43 and 44 that are movable in a direction (width direction) orthogonal to a sheet discharge direction described in FIG. 2A, are made to move several times between a position corresponding to a sheet width and a position wider than the sheet width, whereby an aligning operation is performed for the sheets P stacked in the stapling tray 32.

Figure 2B:
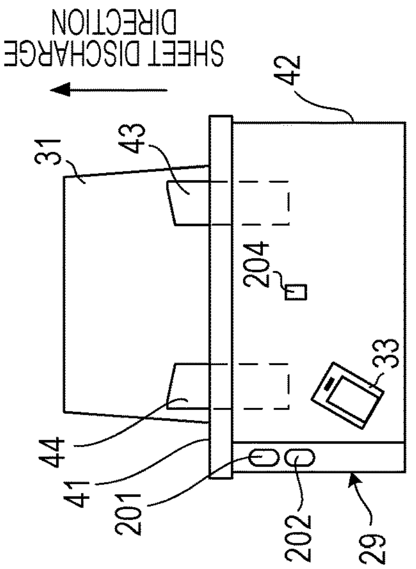
Figure 2C:
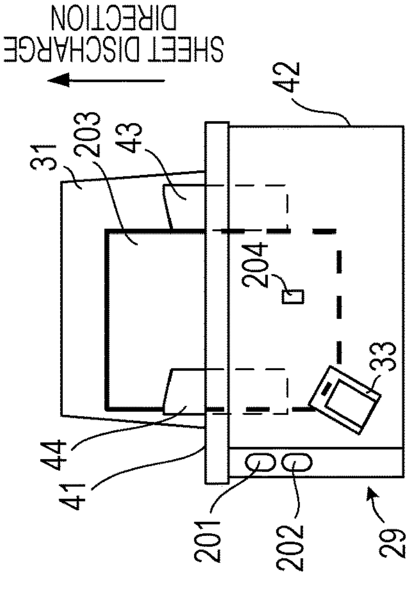
Figure 2D:
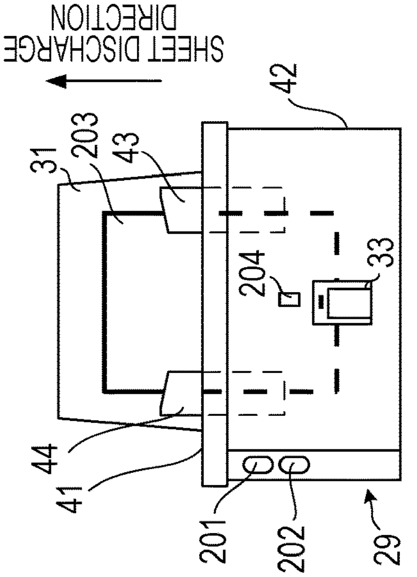
Figure 2E:
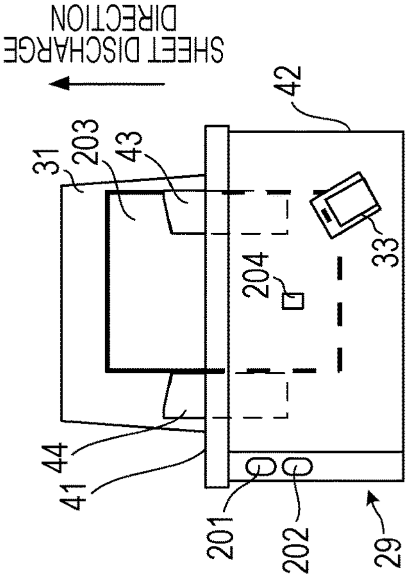

Successively, the sheet guides 43 and 44 (aligning member) are made to stop at the positions corresponding to the sheet width, and a stapling process is performed by the stapling unit 33. The stapling unit 33 can move along an end of a sheet as shown in FIGS. 2C to 2E and can perform the stapling process at different positions of the sheet P. Upon execution of the stapling process, the sheet guides 43 and 44 move to positions wider than the sheet width. Then, a bundle of sheets P having been subjected to the stapling process is discharged to the sheet discharge tray 30 or the sheet discharge tray 31 through a sheet discharging port 41 (discharging port) formed on the main body of an apparatus 42 by the discharge roller pair 36 having moved to a position indicated with a solid line.

Successively, with reference to FIGS. 1 to 2E, description is given to a case where the stapling process is performed for a bundle of sheets inserted from the outside of the main body of the apparatus 42 by a user. Hereinafter, this function is referred to as manual stapling.

As described in FIGS. 2A and 2B, on the post processing apparatus 29, a manual stapling mode shift button 201 and a manual stapling execution button 202 are installed (hereinafter, referred to as a shift button 201 and an execution button 202, respectively).

Moreover, the post processing apparatus 29 includes a sheet detection sensor 204 (recording material detecting unit) that detects a bundle of sheets 203 inserted in the stapling tray 32. The post processing apparatus 29 in the present example is configured such that the manual stapling is executed by inserting a bundle of sheets 203 into the stapling tray 32 from the discharging port 41 by a user. Here, the discharging port 41 is an opening portion through which a bundle of sheets having been subjected to the stapling process in the automatic stapling passes when being discharged to the sheet discharge tray 30 or 31, and through which a bundle of sheets 203 can be inserted from the outside.

In the case of executing the manual stapling, by depressing the shift button 201 by a user, the post processing apparatus 29 shifts to the manual stapling mode. In response to the number of times that the user has depressed the shift button 201, the user can switch a stapling position such as corner binding shown in FIG. 2C, saddle stitching shown in FIG. 2D, and corner binding shown in FIG. 2E. That is, the shift button 201 functions also as a switching unit for switching a stapling position. Upon shifting to the manual stapling mode, the post processing apparatus 29 makes the discharge roller pair 36 and the drawing-in roller 37 shown in FIG. 1 move to the respective positions indicated with a broken line. Furthermore, the sheet guides 43 and 44 are extended from the positions shown in FIG. 2A to the positions corresponding to the maximum size shown in FIG. 2B. Here, the maximum size represents the maximum size among sheets P that can be placed in the stapling tray 32. With this, the sheet guides 43 and 44 are prevented from becoming hindrance when a user inserts a bundle of sheets 203.

A user inserts the bundle of sheets 203 through the discharging port 41 from the outside of the main body of the apparatus 42. At this time, the user needs to insert the bundle of sheets 203 at a setting position (placement position) corresponding to a selected stapling position. In the case of the corner binding shown in FIG. 2C, the user inserts the bundle of sheets 203 along the sheet guide 44. The inserted bundle of sheets 203 is detected by the sheet detection sensor 204 (recording material detection sensor). Upon detection of the bundle of sheets 203 by the sheet detection sensor 204, the stapling unit 33 moves to a left side stapling position, and the post processing apparatus 29 becomes a state of waiting for execution of the manual stapling. Then, upon depression of the execution button 202 by a user, the execution instruction of the stapling process is output, and the post processing apparatus 29 performs the stapling process with the stapling unit 33. In the case of the saddle stitching shown in FIG. 2D, a user inserts the bundle of sheets 203 with matching with the center of the sheet guides 43 and 44. The inserted bundle of sheets 203 is detected by the sheet detection sensor 204. Upon detection of the bundle of sheets 203 by the sheet detection sensor 204, the stapling unit 33 moves to a center stapling position, and the post processing apparatus 29 becomes a state of waiting for execution of the manual stapling. Then, upon depression of the execution button 202 by the user, the post processing apparatus 29 performs the stapling process with the stapling unit 33. In the case of the corner binding shown in FIG. 2E, a user inserts the bundle of sheets 203 along the sheet guide 43. The inserted bundle of sheets 203 is detected by the sheet detection sensor 204. Upon detection of the bundle of sheets 203 by the sheet detection sensor 204, the stapling unit 33 moves to a right-side stapling position, and the post processing apparatus 29 becomes a state of waiting for execution of the manual stapling. Then, upon depression of the execution button 202 by the user, the post processing apparatus 29 performs the stapling process with the stapling unit 33. After the manual stapling process has been ended, the post processing apparatus 29 makes the discharge roller pair 36 and the drawing-in roller 37 move to positions indicated with a solid line in FIG. 1 and makes them rotate in the normal rotation direction, thereby causing the bundle of sheets 203 to be discharged to the sheet discharge tray 30 or 31. In this way, the discharge roller pair 36 and the drawing-in roller 37 are configured to be able to move between the positions indicated with a solid line and the positions indicated with a broken line.

FIGS. 3A to 3D are illustrations showing one example of a seal design to provide notification of a position at which a bundle of sheets 203 for the manual stapling in the present example is to be set.

Figure 3C:
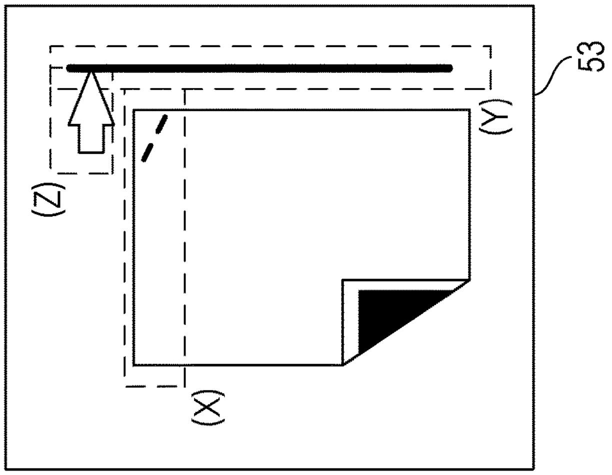
FIGS. 3A to 3D are illustrations showing one example of a design of a seal to be pasted on a main body of an apparatus in Example 1.
Figure 3B:
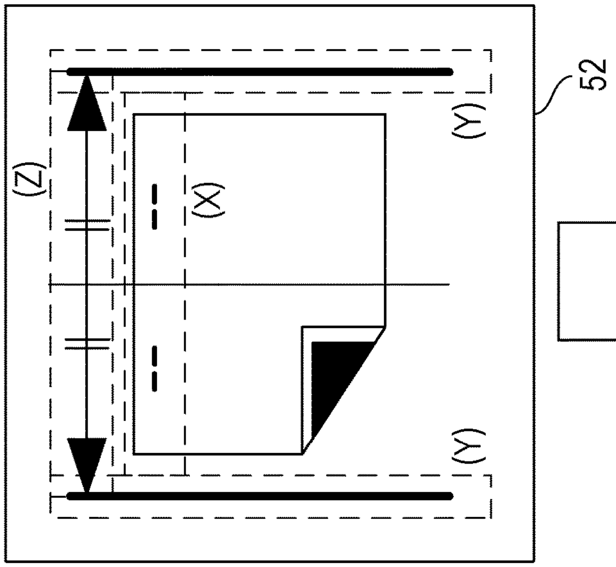
Figure 3A:
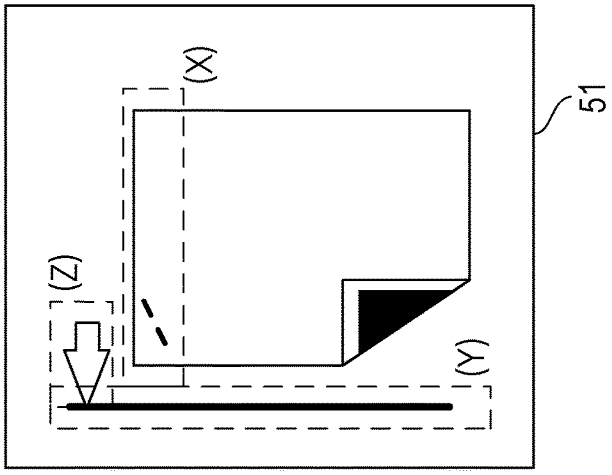
Figure 3D:
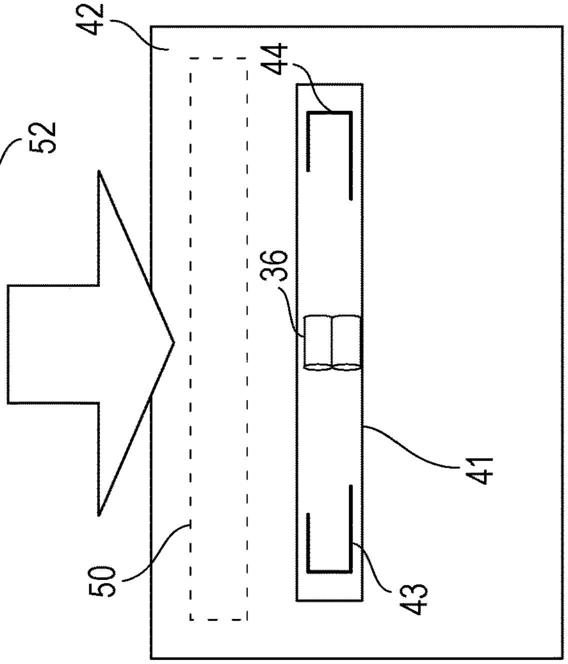

A seal 51 illustrated in FIG. 3A shows a state where the stapling process is executed for one position at an upper left portion of the bundle of sheets 203. A seal 52 illustrated in FIG. 3B shows a state where the stapling process is executed for two positions at an upper portion of the bundle of sheets 203. A seal 53 illustrated in FIG. 3C shows a state where the stapling process is executed for one position at an upper right portion of the bundle of sheets 203. FIG. 3D shows an illustration in which the post processing apparatus 29 is viewed from the downstream side in the sheet discharge direction of the sheet P, and the discharging port 41 is formed on the main body of the apparatus 42. By pasting each of the seals 51 to 53 on a space 50 existing on an upper portion of the discharging port 41, it is possible to notify a user of the setting positions of the bundle of sheets 203. Each of the seals 51 to 53 shows a stapling position and a guide becoming a reference at the time of setting a bundle of sheets 203, and it is necessary to indicate a user at a glance how to set a bundle of sheets 203 along which guide in response to a stapling position.

Between FIGS. 2A to 2E and FIGS. 3A to 3D, the viewing direction is reversed.

Accordingly, a state corresponding to FIG. 3A is FIG. 2E, a state corresponding to FIG. 3B is FIG. 2D, and a state corresponding to FIG. 3C is FIG. 2C. In this connection, although the seal 52 illustrated in FIG. 3B shows a sheet in which the stapling process is executed for two positions at an upper portion of a bundle of sheets 203. However, it may show a state in which the stapling process is executed for one position at an upper portion correspondingly to FIG. 2D.

A broken line in FIGS. 3A to 3D is an auxiliary line for explanation and is assumed not to be reflected to an actual design. In FIGS. 3A, 3B, and 3C, a broken line portion (X) represents a stapling position relative to the bundle of sheets 203. A broken line portion (Y) represents a guide (sheet guide 43 or 44) becoming a reference at the time of inserting the bundle of sheets 203. A broken line portion (Z) represents whether the bundle of sheets 203 is set close to the reference guide (FIGS. 3A, 3C), alternatively, whether the bundle of sheets 203 is set at the center of the guides on both sides (FIG. 3B).

With above, according to the present example, by pasting the seals 51 to 53 on the main body of the apparatus 42, it becomes possible for a user to grasp easily a position at which the bundle of sheets 203 is to be set. Therefore, the usability at the time of executing the manual stapling can be improved, and it is possible to cause the stapling process to be executed at a position intended by a user.

In this connection, in the present example explained, the description has been given to the configuration in which the seals 51 to 53 are pasted on the main body of the apparatus 42. However, an engraved mark of the similar designs may be formed on the main body of the apparatus 42. Moreover, on the seals 51 to 53, not only an image but also a character and a symbol may be described. Moreover, the position on which the seals 51 to 53 are pasted is not restricted to the space 50 shown in FIG. 3D. At the time of inserting the bundle of sheets 203 in the discharging port 41, any position where the user can simultaneously recognize the sheet guides 43 and 44 and the seals or the engraved marks, may be permissible. A space at a lower portion of the discharging port 41 or the like may be permissible. However, since there is a possibility that the seals or the engraved marks are hidden by the bundle of sheets 203 being inserted, an upper portion, a right portion, or a left portion of the discharging port 41 is desirable. Moreover, the design of the present example is one example, and different designs may be used.

Example 2

In the present example, description is given to a configuration in which an LED is provided to the main body of the apparatus as a unit that notifies a user of a position at which a bundle of sheets is to be set for the manual stapling. The description for the main portion is similar to that in Example 1. Accordingly, in here, only a portion different from Example 1 will be described.

Figure 4:
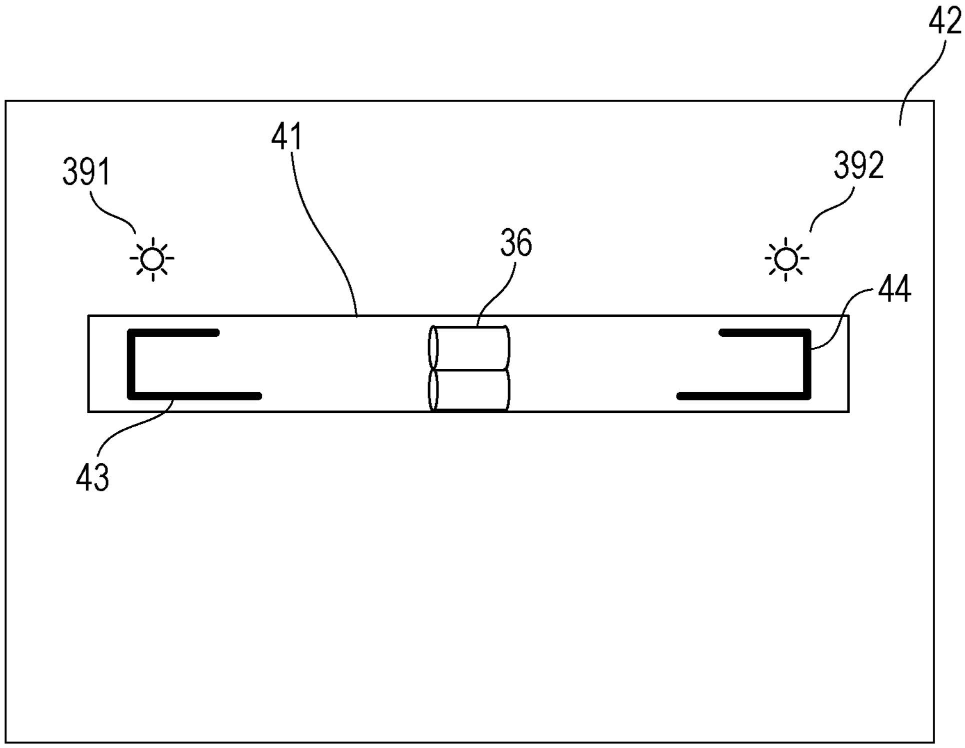
FIG. 4 is an illustration in which a post processing apparatus in Example 2 is viewed from a downstream side in a sheet discharge direction.

FIG. 4 shows an illustration in which the post processing apparatus 29 is viewed from the downstream side in the sheet discharge direction of the sheet P. Different from the configuration shown in FIG. 3D described in Example 1, an LED 391 is provided at an upper portion of the sheet guide 43, and an LED 392 is provided at an upper portion of the sheet guide 44.

Figure 5:
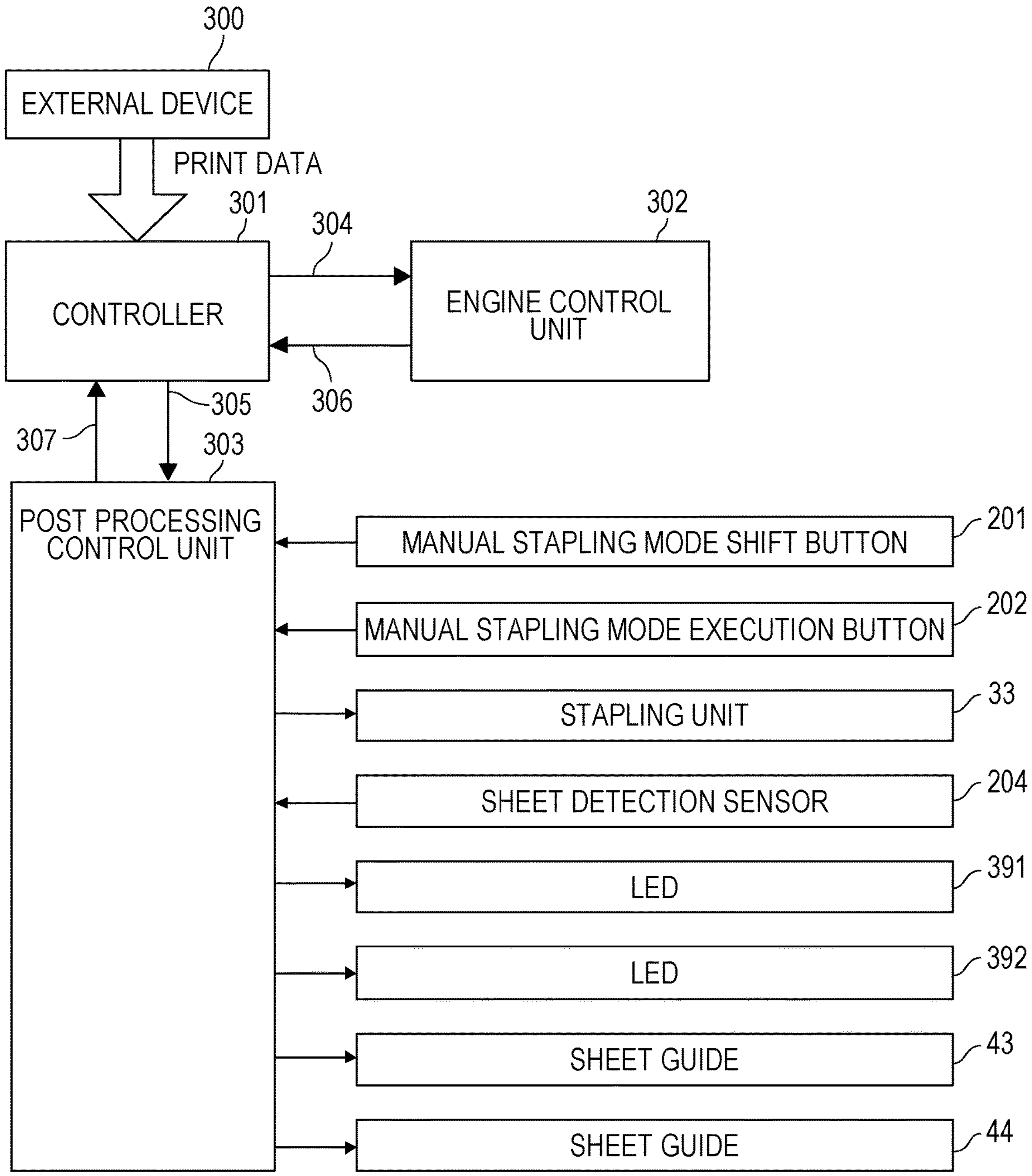
FIG. 5 is a block diagram showing a system configuration of the image forming apparatus and the post processing apparatus in Example 2.

FIG. 5 is a block diagram for describing a system configuration of the image forming apparatus 101 and the post processing apparatus 29 in the present example. A controller 301 communicates with an external device 300, such as a host computer, and receives print data. Moreover, the controller 301 controls the image forming apparatus 101 and the post processing apparatus 29 in an integrated manner, an engine control unit 302 controls the image forming apparatus 101, and a post processing control unit 303 controls the post processing apparatus 29. A reference number 304 is a serial signal line to transmit a command signal from the controller 301 to the engine control unit 302, and a reference number 305 is a serial signal line to transmit a command signal from the controller 301 to the post processing control unit 303. A reference number 306 is a serial signal line to transmit status data from the engine control unit 302 to the controller 301 in response to the command signal, and a reference number 307 is a serial signal line to transmit status data from the post processing control unit 303 to the controller 301 in response to the command signal. The controller 301 performs control by transmitting a command signal to the engine control unit 302 and the post processing control unit 303 and by receiving the status data from the engine control unit 302 and the post processing control unit 303. In this way, in the case where a plurality of devices is connected and operates, the controller 301 manages the control and state of each of the devices in a unified manner and maintains the consistency of the operations between the respective devices. In this connection, the controller 301 and the engine control unit 302 are provided in the image forming apparatus 101, and the post processing control unit 303 is provided in the post processing apparatus 29.

The post processing control unit 303 performs sheet conveyance in response to a command signal from the controller 301. Moreover, the post processing control unit 303 can control switching between the automatic stapling and the manual stapling.

Furthermore, in the case of performing the automatic stapling, the post processing control unit 303 performs the stapling process for a bundle of sheets P discharged from the image forming apparatus 101 by controlling the stapling unit 33. Moreover, in the case of performing the manual stapling, the post processing control unit 303 controls the LEDs 391 and 392 and the sheet guides 43 and 44 on the basis of the number of times that a shift button 201 has been depressed. Successively, the post processing control unit 303 performs the stapling process by controlling the stapling unit 33 based on the execution button 202 and the input signal of the sheet detection sensor 204.

Figure 6:
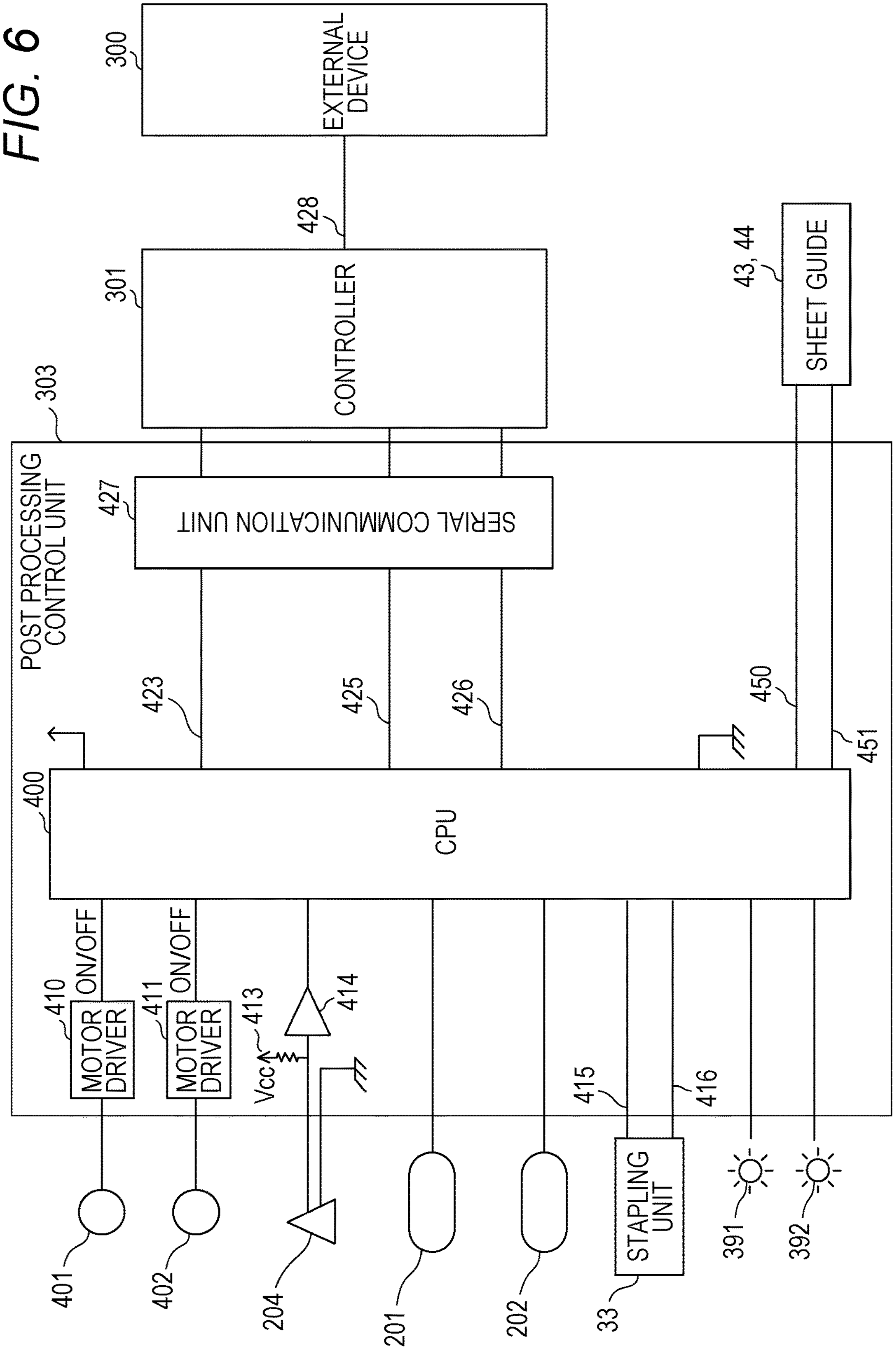
FIG. 6 is a detail view of a post processing control unit in Example 2.

FIG. 6 is a detail view of the post processing control unit 303 in the present example. The post processing control unit 303 includes a CPU 400 and communicates with the controller 301 through a serial communication unit 427. The serial communication unit 427 connects the CPU 400 with the controller 301 with a plurality of signal lines including the serial signal lines 305 and 307. Upon notification of the print data 428 to the controller 301 through the external device 300, the controller 301 notifies the CPU 400 of a sheet discharging operation start signal 423 and the like through the serial communication unit 427. Here, the sheet discharging operation start signal 423 is a signal that provides notification of a timing at which a sheet P is conveyed from the image forming apparatus 101 to the post processing apparatus 29. Moreover, the CPU 400 notifies the controller 301 of a sheet discharging operation status signal 425, a mode shift signal 426, and the like through the serial communication unit 427. Here, the sheet discharging operation status signal 425 is a signal that shows a processing state of a sheet P in the inside of the post processing apparatus 29. Moreover, the mode shift signal 426 is a signal that notifies that the manual stapling mode has been canceled.

To the output ports of the CPU 400, motor drivers 410 and 411 are connected. The motor driver 410 drives a sheet discharge motor 401. By rotating the sheet discharge motor 401 in the normal rotation direction or the reverse rotation direction, it is possible to make the discharge roller pair 36 and the drawing-in roller 37 rotate in the normal rotation direction or the reverse rotation direction. By rotating the discharge roller pair 36 and the drawing-in roller 37 in the normal rotation direction, it is possible to discharge a sheet P to the sheet discharge tray 30 or 31, and by rotating the discharge roller pair 36 and the drawing-in roller 37 in the reverse rotation direction, it is possible to draw in a sheet P into the stapling tray 32. The motor driver 411 drives a separation motor 402. By rotating the separation motor 402 in the normal rotation direction or the reverse rotation direction, it is possible to move the discharge roller pair 36 and the drawing-in roller 37 to a contact position or a separated position. The contact position is a position at which the discharge roller pair 36 and the drawing-in roller 37 come in contact with a sheet P placed in the stapling tray 32, and the separated position is a position at which the discharge roller pair 36 and the drawing-in roller 37 are separated from a sheet P placed in the stapling tray 32. The sheet detection sensor 204 uses a pull-up 413 and inputs a sensor state (ON signal, or OFF signal) into the CPU 400 through a buffer 414. The shift button 201 and the execution button 202 input a depressed state (ON signal, or OFF signal) of a button into the CPU 400.

To the output ports of the CPU 400, a jogger drive signal 450 of the sheet guide 43 and the sheet guide 44 is connected, and to the input ports, a jogger home position sensor signal 451 of the sheet guide 43 and the sheet guide 44 is connected. At the time of performing a stapling operation, the CPU 400 controls a jogger motor (not shown) that drives the sheet guide 43 and the sheet guide 44, through a jogger drive signal 450 and makes a jogger open and close. Then, in response to an input value of a jogger home position sensor (not shown), the CPU 400 makes the jogger motor stop through the jogger drive signal 415. Moreover, to the output ports of the CPU 400, a staple motor drive signal 415 of the stapling unit 33 is connected, and to the input ports, a home position sensor signal 416 of the stapling unit 33 is connected. Here, the home position sensor signal 416 is a signal that shows whether the stapler is located at a home position. At the time of performing a stapling operation, the CPU 400 performs the stapling process by driving the staple motor in the stapling unit 33 through the staple motor drive signal 415. Successively, in response to the input value of the home position sensor signal 416, the CPU 400 stops the staple motor through the staple motor drive signal 415. Moreover, to the output ports of the CPU 400, an LED 391 and an LED 392 are connected. The CPU 400 switches the lighting states of the LED 391 and the LED 392 correspondingly to a plurality of manual stapling modes to be set correspondingly to the number of times that the shift button 201 has been depressed, or the OFF state of the manual stapling mode.

Figure 7:
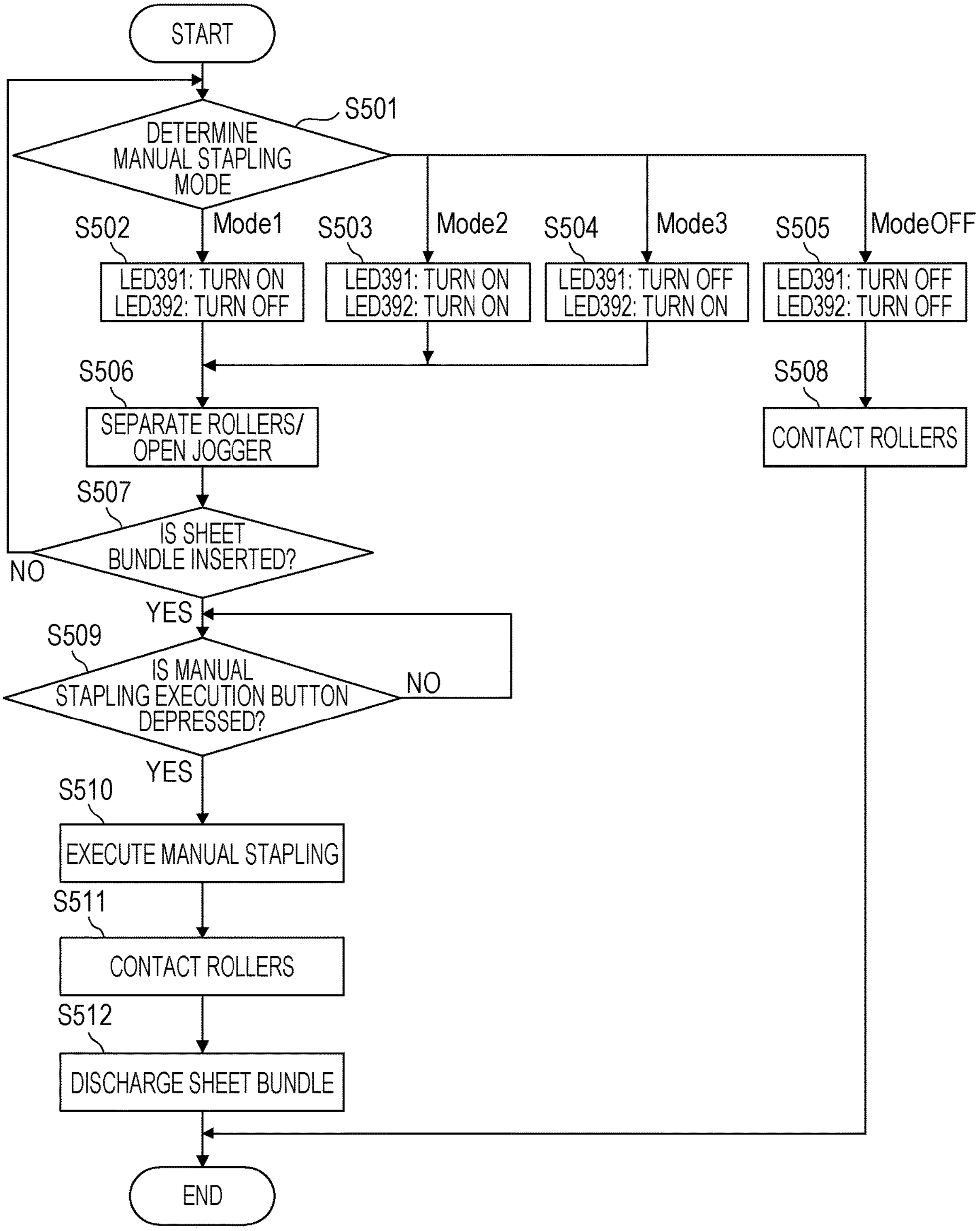
FIG. 7 is a flowchart showing the operation of the post processing control unit in Example 2.

FIG. 7 is a flowchart showing the operation of the post processing control unit 303 at the time of executing the manual stapling in the present example. The control on the basis of FIG. 7 is executed on the basis of the programs memorized in a ROM and the like of the CPU 400 installed in the post processing control unit 303.

The present flowchart is started by the depression of the shift button 201 by a user. Upon starting the flowchart, first, the post processing control unit 303 determines whether the mode has shifted to which mode of the plurality of the manual stapling modes (S501). In the case where the mode has shifted to Mode 1 shown in FIG. 2E, the post processing control unit 303 makes the LED 391 turn on and makes the LED 392 turn off (S502). In the case where the mode has shifted to Mode 2 shown in FIG. 2D, the post processing control unit 303 makes both the LED 391 and the LED 392 turn on (S503). In the case where the mode has shifted to Mode 3 shown in FIG. 2C, the post processing control unit 303 makes the LED 391 turn off and makes the LED 392 turn on (S504). In the case of Mode OFF, the post processing control unit 303 makes both the LED 391 and the LED 392 turn off (S505). In this connection, as having described in the Example 1, since the viewing direction is reversed Between FIGS. 2A to 2E and FIG. 4, the correspondence relation becomes as descried above.

Mode 1 to Mode 3 and Mode OFF are switched sequentially for each time when the shift button 201 has been depressed. Moreover, in the case of Model to Mode 3, the post processing control unit 303 makes each the discharge roller pair 36 and the drawing-in roller 37 separate. Then, the jogger drive signal 450 is made ON, and the jogger drive signal 450 is made OFF a predetermined time after the jogger home position sensor signal 451 detects a home position, thereby widening the sheet guides 43 and 44 to the maximum width (S506). With this, preparation has been made against the insertion of the bundle of sheets 203 to the discharging port 41 by a user. In the case of Mode OFF, the post processing control unit 303 makes the discharge roller pair 36 and the drawing-in roller 37 come in contact (S508) and ends the manual stapling mode.

In the case where the insertion of the bundle of sheets 203 by a user has been detected in S507, the post processing control unit 303 waits for the depression of the execution button 202 by the user (S509). In the case where the depression of the execution button 202 by the user has been detected in S509, the post processing control unit 303 makes the stapling unit 33 execute the manual stapling (S510). Successively, the post processing control unit 303 makes the discharge roller pair 36 and the drawing-in roller 37 come in contact (S511) and makes the discharge roller pair 36 and the drawing-in roller 37 rotate, thereby discharging the bundle of sheets 203 having been subjected to the manual stapling process into the sheet discharge tray 30 or 31 (S512). With the above, the control of the present flowchart is ended.

With the above, according to the present example, the lighting situations of the LEDs disposed in the vicinity of in the sheet guides are changed in response to a manual stapling mode selected by a user, whereby it is possible for the user to determine that a bundle of sheets is to be inserted along which sheet guide. Therefore, the usability at the time of executing the manual stapling can be improved, and it is possible to cause the stapling process to be executed at a position intended by a user.

In this connection, in the present example, in order to indicate a sheet guide becoming a reference, the LED has been used. However, a light emitting body other than the LED may be used. Moreover, a configuration may be employed in which light is irradiated a reference sheet guide itself. Moreover, the light emitting part may be made not only to turn on, but also to blink.

Moreover, by displaying a specific illustration on an image panel (not shown) as a display unit attached to the image forming apparatus 101, a reference guide along which a bundle of sheets is to be set may be indicated in response to a manual stapling mode selected by a user.

Example 3

In the present example, description is given to a method in which, as a unit that notifies a user of a position at which a bundle of sheets for the manual stapling is to be set, a sheet guide itself is made to move in a sheet discharge direction (discharge direction). The description for the main portion is similar to that in Example 1 and Example 2. Accordingly, in here, only a portion different from Example 1 and Example 2 will be described.

Figure 8:
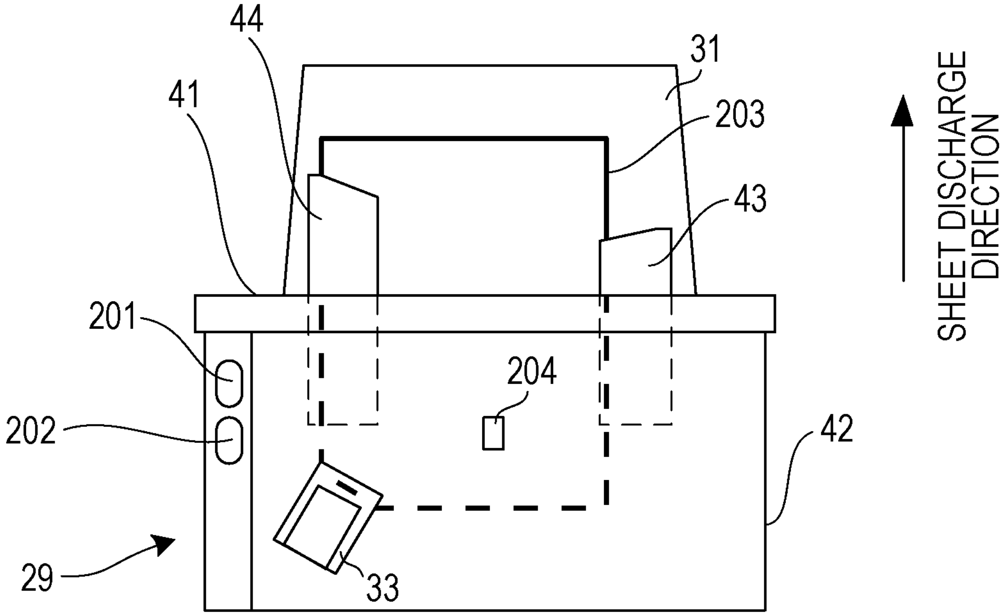
FIG. 8 is a bird's-eye view of the post processing apparatus in Example 3.

FIG. 8 is a bird's-eye view of the post processing apparatus 29 in the present example. The movable range of each of the sheet guide 43 and the sheet guide 44 is different from that in FIGS. 2A to 2E described in Example 1. In response to a manual stapling mode designated by a user by the depression of the shift button 201 by the user, the sheet guide 43 and the sheet guide 44 are caused to be moved in the sheet discharge direction, whereby it is possible to indicate that a user should insert the bundle of sheets 203 along which sheet guide. FIG. 8 shows a state where the sheet guide 44 has been moved in the sheet discharge direction.

Figure 9:
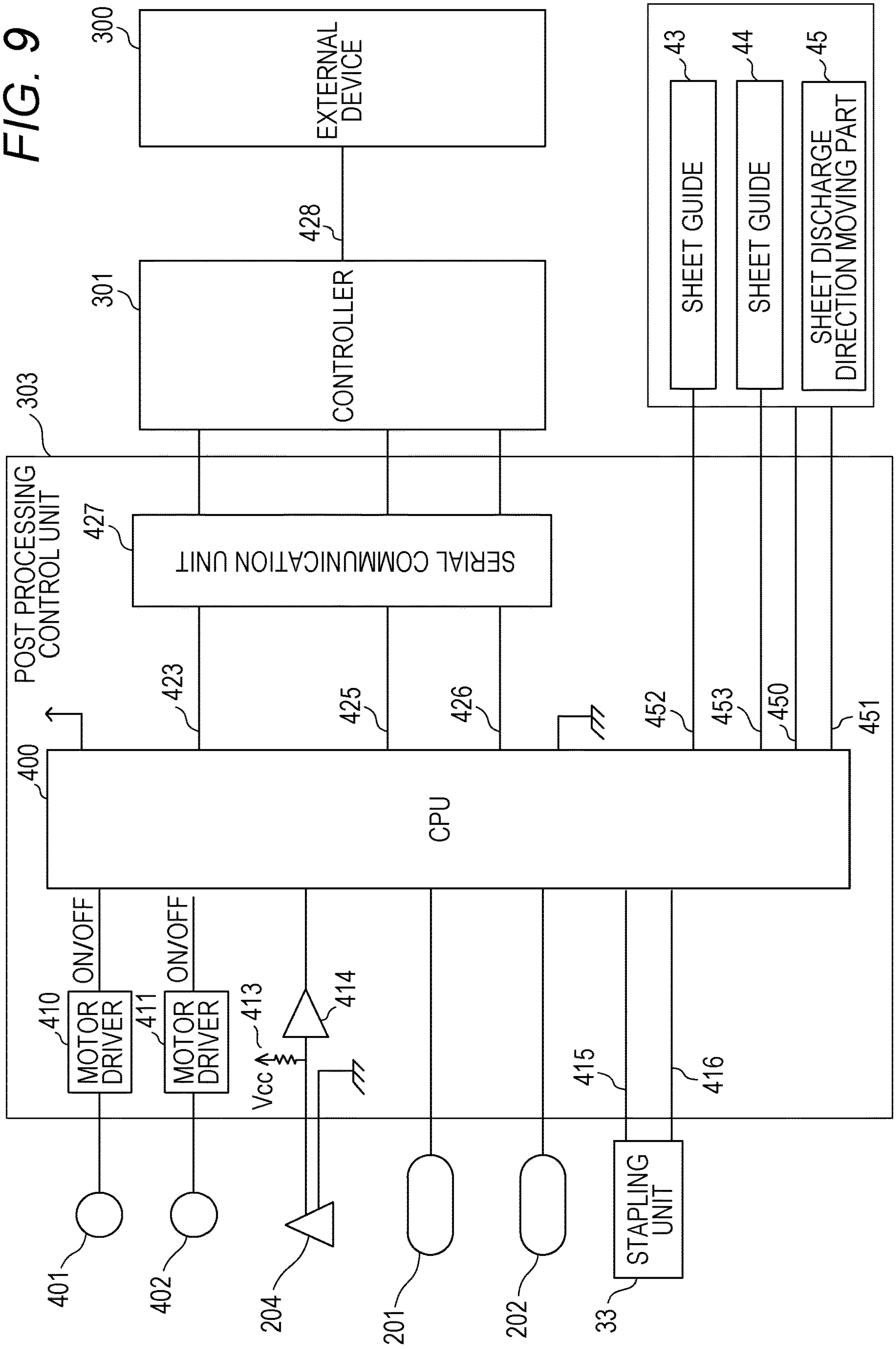
FIG. 9 is a detail view of a post processing control unit in Example 3.

FIG. 9 is a detail view of the post processing control unit 303 in the present example. FIG. 9 is different from FIG. 6 described in Example 2 in a point that a sheet guide drive signal 452 that makes the sheet guide 43 move in the sheet discharge direction and a sheet guide drive signal 453 that makes the sheet guide 44 move in the sheet discharge direction, are connected to the CPU 400. A sheet discharge direction moving part 45 shows a mechanism that makes the sheet guide 43 or 44 move in accordance with the sheet guide drive signal 452 or 453. The CPU 400 controls each of the sheet guide drive signals 452 and 453 in response to the plurality of manual stapling modes to be set in response to the number of times that the shift button 201 has been depressed or to the OFF state of the manual stapling mode. With this, each of the sheet guides 43 and 44 can be moved in the sheet discharge direction.

Figure 10:
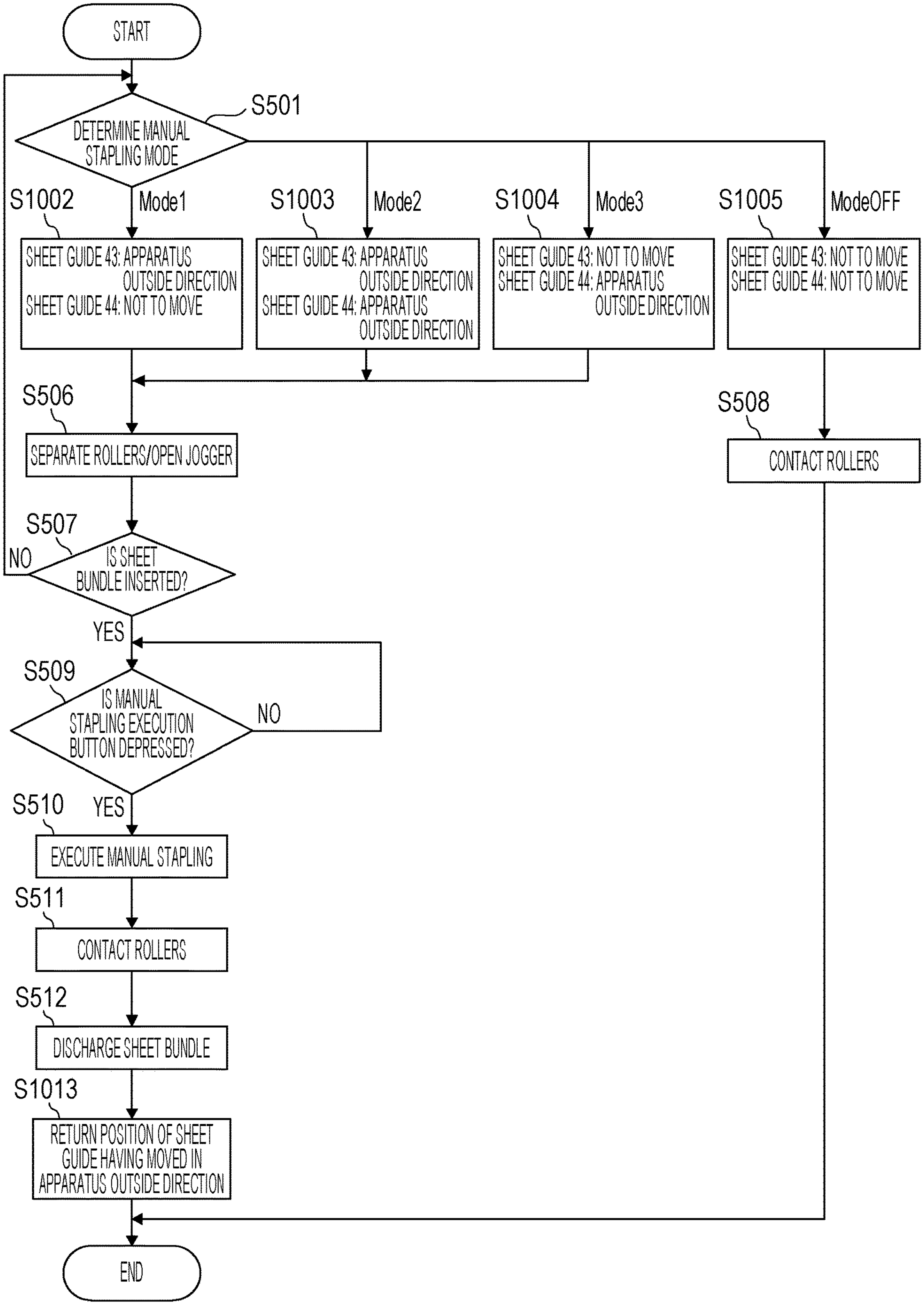
FIG. 10 is a flowchart showing the operation of the post processing control unit in Example 3.

FIG. 10 is a flowchart showing the operation of the post processing control unit 303 at the time of executing the manual stapling in the present example. The control on the basis of FIG. 10 is executed on the basis of a program memorized in a ROM and the like of the CPU 400 installed in the post processing control unit 303. Portions different from FIG. 7 described in Example 2 are operations from S502 to S505 that are control correspondingly to the manual stapling modes of the post processing control unit 303 and an operation in S1013 to be performed after the bundle of sheets has been discharge in S512. In this connection, in the flowchart shown in FIG. 10, only the processing of from S1002 to S1005 and S1013 that have differences from FIG. 7 is described, and with regard to the other processing, description will be omitted.

In the case where the manual stapling mode selected by the user is Mode 1 shown in FIG. 2E, the post processing control unit 303 makes the sheet guide 43 move in the direction toward the outside of the apparatus and does not make the sheet guide 44 move (S1002). In the case where the selected manual stapling mode is Mode 2 shown in FIG. 2D, the post processing control unit 303 makes both the sheet guide 43 and the sheet guide 44 move in the direction toward the outside of the apparatus (S1003). In the case where the selected manual stapling mode is Mode 3 shown in FIG. 2C, the post processing control unit 303 does not make the sheet guide 43 move and makes the sheet guide 44 move in the direction toward the outside of the apparatus (S1004). In the case of Mode OFF, the post processing control unit 303 does not make both the sheet guide 43 and the sheet guide 44 move (S1005). Moreover, after having performed the manual stapling and having discharged a bundle of sheets, the post processing control unit 303 makes the sheet guide 43 or the sheet guide 44 that has been made to move to toward the outside of the apparatus, move in the direction toward the inside of the apparatus and returns them to the original position (S1013). With the above, the control of the present flowchart is ended.

With the above, according to the present example, in response to a manual stapling mode selected by a user, the position of the sheet guide itself is made to move in the direction toward the outside of the apparatus or in the direction toward the inside of the apparatus independently, whereby it is possible for the user to determine that a bundle of sheets is to be inserted along which sheet guide. Therefore, the usability at the time of executing the manual stapling can be improved, and it is possible to cause the stapling process to be executed at a position intended by a user.

In this connection, in the present example, the description has been given to the configuration as an example in which each of the sheet guide 43 and the sheet guide 44 can move in the direction (sheet discharge direction) toward the outside of the apparatus. The configuration is not limited to this. The configuration may be made such that each of the sheet guide 43 and the sheet guide 44 can move in the direction toward the inside of the apparatus. In this case, the other guide that is not a noticeable reference guide, is made to move in the direction toward the inside of the apparatus. Moreover, the configuration may be made such the sheet guide can move both in the direction toward the outside of the apparatus and in the direction toward the inside of the apparatus.

Moreover, in the above-described Examples 1 to 3, the description has been given to a configuration in which the manual stapling modes are switched by repeatedly depress the shift button 201. However, the configuration is not limited to this. In addition to the shift button 201, another button for switching the manual stapling modes may be prepared separately.

Moreover, in the above-described Examples 1 to 3, the shift button 201 and the execution button 202 may not be provided to the post processing apparatus 29 and may be provided to the image forming apparatus 101. Moreover, the shift button 201 and the execution button 202 need not to be a physical button as described in FIGS. 2A to 2E and may be a virtual button indicated on a display or the like.

Moreover, in the above-described Examples 1 to 3, there is no need to provide a unit to switch the operating mode of the post processing apparatus 29, such as the shift button 201, to the post processing apparatus 29. For example, the configuration may be made such that the operating mode of the post processing apparatus 29 can be switched from the external device 300.

Moreover, in the above-described Examples 1 to 3, the example of the laser-beam printer has been shown. However, the image forming apparatus to which the present disclosure is applied, is not restricted to this, and may be printers of other printing methods, such as ink-jet printers, or copying machines.

According to the present disclosure, it becomes possible to improve the usability at the time of executing the manual stapling and to cause the stapling process to be executed at a position intended by a user.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A post processing apparatus connectable to an image forming apparatus, the post processing apparatus comprising:

a conveyance roller pair configured to convey a sheet on which an image is formed by the image forming apparatus;

a staple tray on which the sheet conveyed by the conveyance roller pair is to be stacked;

an aligning member pair configured to align a bundle of sheets which are conveyed by the conveyance roller pair and stacked on the staple tray;

a stapling unit configured to staple the bundle of sheets stacked on the staple tray and aligned by the aligning member pair;

a sheet discharge tray onto which the bundle of sheets stapled by the stapling unit is discharged through a discharging port, wherein the post processing apparatus has a manual stapling mode to staple sheets inserted by a user through the discharging port and placed on the staple tray; and a notification unit configured to notify the user of a position on the staple tray at which the sheets should be placed in the manual stapling mode.

* * * * *